United States Patent
Segard

(10) Patent No.: US 10,478,765 B2
(45) Date of Patent: Nov. 19, 2019

(54) METHOD FOR IN-LINE CONTROL OF THE INTEGRITY OF A FILTERING SYSTEM

(71) Applicant: ROQUETTE FRERES, Lestrem (FR)

(72) Inventor: David Segard, Lestrem (FR)

(73) Assignee: ROQUETTE FRERES, Lestrem (FR)

( * ) Notice: Subject to any disclaimer, the term of this patent is extended or adjusted under 35 U.S.C. 154(b) by 437 days.

(21) Appl. No.: 15/305,376

(22) PCT Filed: May 13, 2015

(86) PCT No.: PCT/FR2015/051257
§ 371 (c)(1),
(2) Date: Oct. 20, 2016

(87) PCT Pub. No.: WO2015/173515
PCT Pub. Date: Nov. 19, 2015

(65) Prior Publication Data
US 2017/0043290 A1    Feb. 16, 2017

(30) Foreign Application Priority Data
May 15, 2014   (FR) ..................................... 14 54355

(51) Int. Cl.
*B01D 46/00* (2006.01)

(52) U.S. Cl.
CPC ...... *B01D 46/0086* (2013.01); *B01D 2273/18* (2013.01); *B01D 2279/65* (2013.01)

(58) Field of Classification Search
CPC .............. B01D 46/0086; B01D 46/446; B01D 2273/18; B01D 2279/65
See application file for complete search history.

(56) References Cited

U.S. PATENT DOCUMENTS

| | | | |
|---|---|---|---|
| 3,968,035 A * | 7/1976 | Howe | C02F 3/1284 210/621 |
| 2009/0145111 A1 | 6/2009 | Takahashi et al. | |
| 2012/0323377 A1 * | 12/2012 | Hoglund | F24F 11/30 700/277 |
| 2014/0283682 A1 * | 9/2014 | Hamann | B01D 46/0086 95/10 |

FOREIGN PATENT DOCUMENTS

WO    2013/049109 A1    4/2013

OTHER PUBLICATIONS

International Search Report, dated Mar. 16, 2016, from corresponding PCT application.

* cited by examiner

*Primary Examiner* — Robert Clemente

(57) ABSTRACT

A method for in-line control of the integrity of a filtering system implemented during an industrial process including the filtering of a gas through the filtering system, the filtering system including at least one filtering cartridge, the method including at least the following steps: —a measurement step (S1) which involves measuring a pressure difference ΔP representative of the pressure loss caused by the filtering system (F1; F2), —a testing step (S2, S3) which involves comparing the measurement (S1) with a predefined high threshold (Sh) and a predefined low threshold (Sb), in such a way as to consider the at least one filtering cartridge to be non-compliant when the pressure difference measured in the measurement step (S1) falls outside a range located between the high threshold (Sh) and the low threshold (Sb).

13 Claims, 6 Drawing Sheets

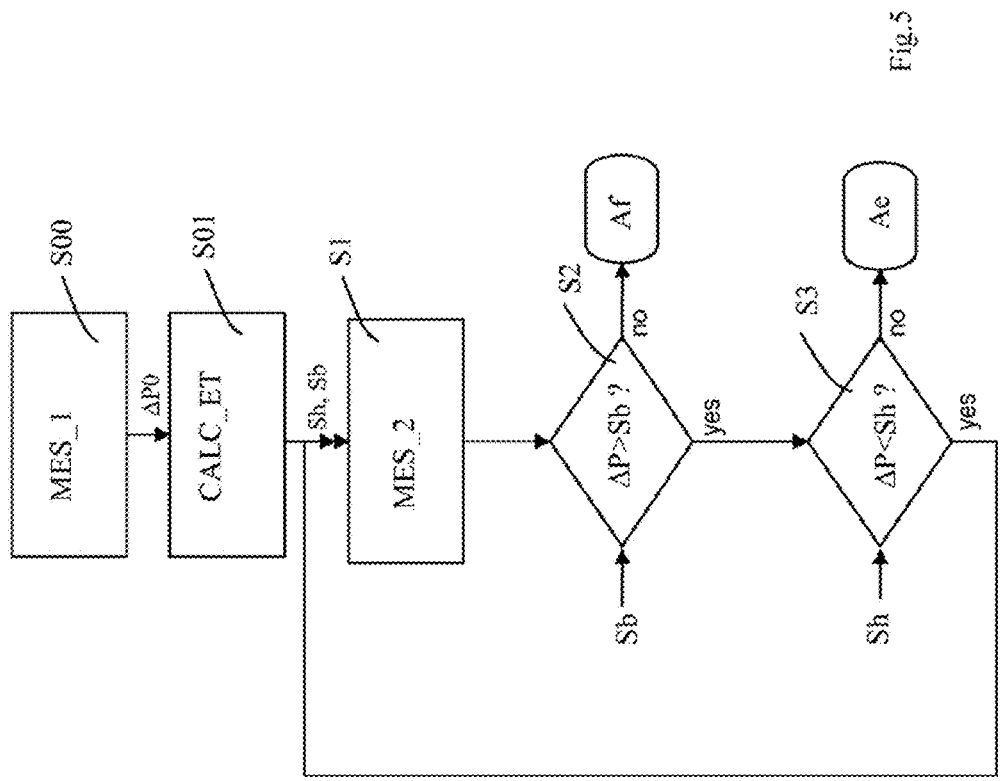

PARKER ZCHT
PALL CPFR

METHOD FOR IN-LINE CONTROL OF THE INTEGRITY OF A FILTERING SYSTEM

The present invention relates to a method for in-line control of the integrity of a filtering system. The field of the invention is that of industrial processes comprising a step of filtering a gas through a filtering system.

The invention will find particular application in industrial processes implementing filtration to sterilize a gas, such as air for example, and particularly industrial fermentation processes.

In the field of fermentation, installations are known from the state of the art comprising a fermentation reactor, hereinafter designated "fermenter", in which the fermentation reaction takes place, generally in controlled temperature and agitation conditions. These installations include compressors and pipes that convey a gas, air in this case, in the fermentation installation, or in contact with the fermentable product, or in contact with a material intended to supply the fermentation reaction.

Air can thus be conveyed directly into the fermenter vessel, particularly when an aerobic fermentation environment is sought. Alternatively or additionally, the gas may be used for the pneumatic transport of a carbon-rich material such as glucose intended to be conveyed to the fermentation reactor. In this case, the gas helps push the material, from a storage tank to the fermenter vessel.

In both cases, the gas must be sterilized to prevent contamination (direct or indirect) of products in the fermenter. For this purpose, the installation comprises filtering systems on the gas line whose function is to sterilize the gas by retaining the bacteria in suspension. In practice, this type of system comprises a housing receiving a plurality of so-called sterilizing filtering cartridges. These sterilizing cartridges are characterized by their ability to retain bacteria having a particle size in the order of one tenth of a micrometer.

These filtering cartridges are consumables and must be replaced when excessively fouled. In some industrial processes, and particularly in fermentation processes, it is imperative that the filtering cartridges be replaced before the filter media becomes excessively fouled. These highly fouled cartridges lead to energy losses and flow rate losses associated with the pressure loss. It is also imperative that the filtering cartridges be replaced before the filter deteriorates (related to ageing, a pressure surge) which creates fiber shedding and/or contamination risks. For certain industrial fermentations, the appearance of contamination is unacceptable and involves emptying the fermenter, discarding its contents, then sterilizing the fermentation installation before a new production operation is undertaken. Contamination results in considerable downtime.

To avoid such an inconvenience, it is customary to replace the filtering cartridges periodically as a preventive measure, without really knowing their integrity status. Thus, and for industrial fermentations, the present applicant replaces cartridges periodically every 12 months.

The person skilled in the art of filtration is aware of various tests used to monitor a filter, and in particular:

1) The bubble point test: This test is used to detect leaks through the filter. The filter is first immersed in a water/ethanol solution, and then subjected to a predetermined, fixed pressure. The observation of bubbling indicates a leak.

2) The diffusion test: The cartridge must be wetted with a water/ethanol solution. Pressure is applied and the flow rate is quantified through precise measurement.

3) The pressure hold test: The cartridge must be wetted with a water/ethanol solution, for example. Pressure is applied and the loss of this pressure is observed over a given period of time.

4) The water intrusion test: This test, commonly referred to as WIT, enables sterilizing cartridges to be tested without alcohol, only with water.

5) The aerosol test: This test requires the dispersal of an aerosol of particles (oil mist), between 0.2 and 0.3 micrometers, then the particles that have passed through the filter are laser counted at the outlet.

These various tests have the following drawbacks:
they are not always feasible for all types of gas filtering cartridges,
they require access to specific characteristics of the filtering cartridge that the manufacturer may not disclose,
the majority of tests require that the cartridges be pre-treated prior to the test (i.e. wetting).

In addition, all of these tests often require that the filtering cartridge be removed from its housing before conducting the test. In any case, none of the tests mentioned above allow the integrity of a filtering system to be monitored in-line, i.e. during filtration of the gas for use in the industrial process.

The use of pressure gauges to determine the status of the filter in filtrating systems is also known from the state of the art. According to the findings of the inventors, the pressure gauges used for this application have a sensitivity of +/−250 millibars (25,000 Kilo Pascals) and only make it possible to observe that the filters of the filtering system have reached their maximum pressure loss (data provided by the filtering cartridge manufacturer), with the risk of clogging, additional consumption, decrease in flow rate and blocking of the fermentation.

According to the findings of the inventors, and prior to an integrity fault, the use of significantly fouled filtering cartridges generates a pressure loss that leads to additional electricity consumption of the compressors used to convey the gas and to perform the filtration. In industrial processes for which the gas flow rate (normal flow rate) is typically much greater than 100 $Nm^3/H$, often even greater than 1,000 $Nm^3/H$, this pressure loss results in a considerable increase in electricity consumption costs.

The purpose of the present invention is to overcome all or part of the aforementioned drawbacks by providing a method for controlling the integrity of a filtering system, in-line, thus making it possible to verify the integrity of the filtering system during said industrial process, while the filtration is taking place through said filtering system.

More particularly, and in the case of a filtrating system with sterilizing filtering cartridges, an objective of the invention is to provide such a control method that can alert the user of the need to replace the filtering cartridges, before contamination occurs.

Another purpose of the present invention is to provide such a control method that can be advantageously implemented, without knowing the inherent technical characteristics of the filtering cartridges of the system.

Another purpose of the present invention is, at least as an embodiment, to provide an in-line control method which can alert the user of the need to replace the filtering cartridges, and in order to avoid additional consumption of the compressors used to perform the filtration.

Other advantages of the present invention will emerge during the following description which is given only as a guide and is not intended to limit same.

The invention relates to a method for in-line control of the integrity of a filtering system implemented in an industrial process involving the filtration of a gas through said filtering system, said filtering system comprising at least one filtering cartridge, the method comprising at least the following steps:

a measuring step during which a pressure difference ΔP, representative of the pressure loss generated by the filtering system, is measured, a testing step during which said measurement is compared to a predetermined upper threshold and a predetermined lower threshold, in such a way as to consider said at least one filtering cartridge to be non-compliant when the pressure difference measured in the measuring step falls outside a range located between said upper threshold and said lower threshold.

The invention shall be better understood upon reading the following description accompanied by the annexed drawings in which:

FIG. 5 is a diagram illustrating the various steps of a method according to the invention, steps that can be implemented automatically by computer means.

The invention arose from the desire of the applicant to ensure better monitoring of the sterility of the gases coming into contact with the products in industrial fermentations, and particularly contamination-sensitive fermentations.

Figure 1:
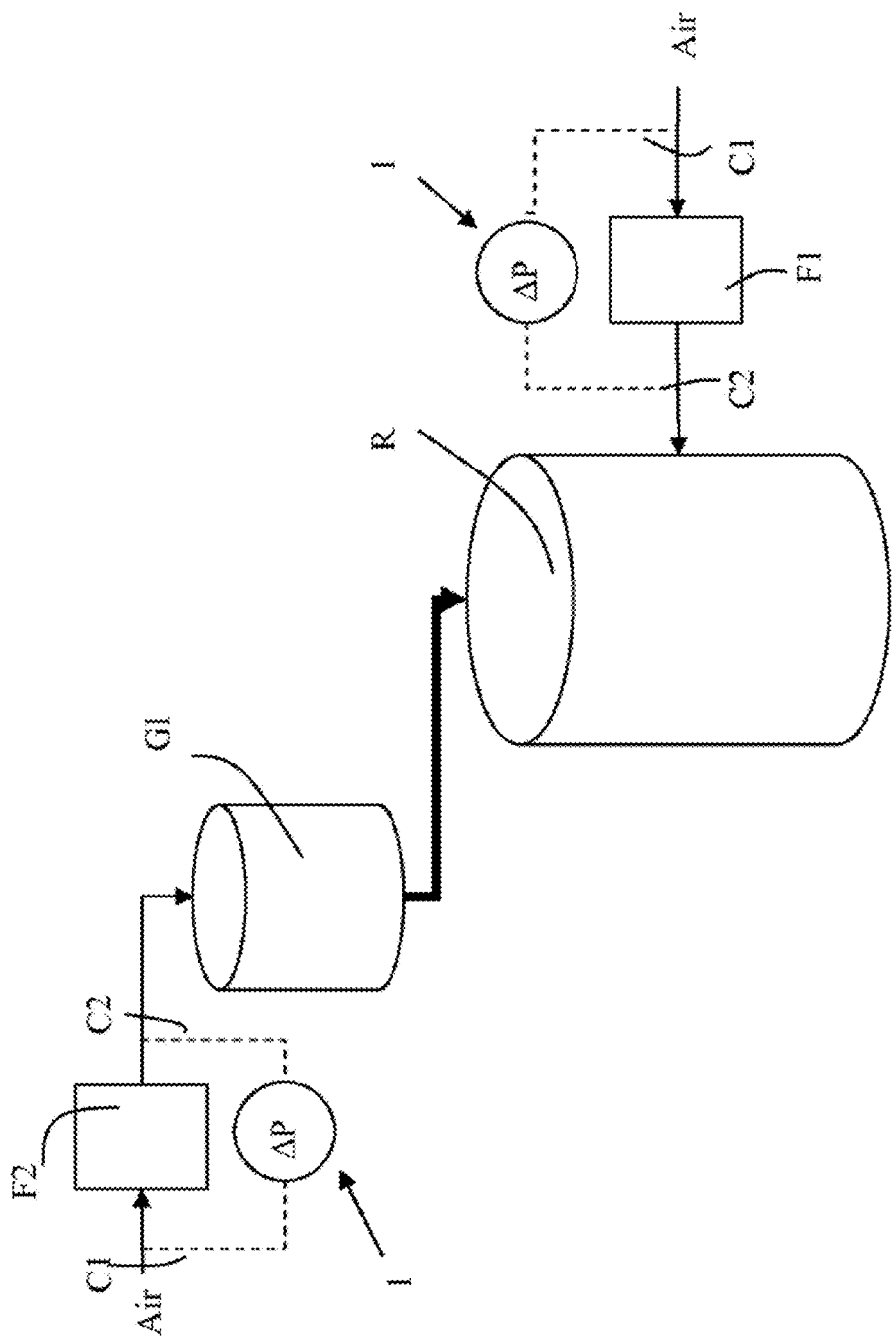
FIG. 1 is a schematic view of an installation for implementing an industrial fermentation process and on which the control method according to the invention is implemented.

FIG. 1 schematically illustrates a fermentation installation which comprises a fermentation reactor R, also referred to as the fermenter. The fermenter comprises a vessel inside of which the fermentation of fermentable products takes place in controlled conditions. Such a fermenter may typically comprise exchangers to control the temperature of the reaction, and a rotor/stator pair to agitate the products in the vessel.

The installation may comprise a compressed air source and a line conveying air directly to the fermentation reactor R. To prevent contamination of the fermentable products, this air is filtered through a filtering system F1 before entering the reactor. Such a filtering system F1 typically comprises a housing with an inlet for unfiltered gas and an outlet for filtered gas. A set of filtering cartridges are removably placed in this housing, typically arranged so as to filter gases in parallel.

The installation may further comprise a G1 tank for a carbon-rich material, typically glucose. Another gas line connected to the compressed air source connects the G1 tank and serves to push the material in the G1 tank into a pipe and up to the fermentation reactor. Prior to entering the G1 tank, this air is filtered in another filtering system F2, to avoid contaminating the carbon-rich material.

In order to avoid contaminations, sterilizing filtering cartridges having pore diameters less than or equal to 0.22 μm are used, on the filtering systems F1 and F2, respectively, for retaining micro-organisms. During fermentation, the integrity of the cartridges must be monitored in order to prevent contamination. Contaminations appear when the cartridges are non-integral: a non-integral cartridge can be the result of a preferential passage (a leak). Furthermore, a non-integral cartridge can be the result of excessive fouling, very often accompanied by a significant risk of filter media fiber shedding.

To avoid any inconvenience, and to the inventors' knowledge, it is customary to periodically replace the filtering cartridges as a preventive measure, every 12 months for example, without precisely knowing their integrity status.

Wishing to obtain in-line monitoring of his process, the present applicant has contacted various actors specialized in sterilizing filtrations, namely manufacturers of gas sterilizing cartridges and integrity testing instruments for such gas cartridges.

The solutions offered by these actors were limited to the test solutions mentioned above, namely "bubble point test", "pressure hold test", "diffusion test", "water introduction test", and the "aerosol test". None of these solutions were chosen due to the drawbacks mentioned above and their very high implementation costs. In addition, none of the tests mentioned above can be used to monitor the integrity of a filtering system, in-line, i.e. during the filtration of the gas through the filtering system and for the needs of the industrial process.

The applicant ingeniously designed a method to control the integrity of a filtering system (F) that can monitor the integrity of the filtering system, in-line, i.e. without disrupting the industrial process and the filtration of gas performed during this process.

The invention finds particular application in the monitoring of filtering systems implemented in an industrial fermentation, particularly implemented in an installation of the type illustrated in FIG. 1. However, the method for controlling the integrity is not limited to this industrial process and may find particular application in other industrial processes, and notably those in which similar requirements on the filtered gas are encountered.

The invention also relates to a method for controlling the integrity of a filtering system F1; F2, said filtering system F1; F2 comprising at least one filtering cartridge, namely one filtering cartridge or, preferably, several filtering cartridges. In the latter case, the filtering cartridges preferably provide filtration of the gas in parallel.

It is an in-line method implemented during an industrial process comprising the filtration of a gas such as air through the filtering system F1; F2. This test is therefore carried out during the filtration of the gases for the needs of the industrial process, at the operating flow rate of the process, which is preferably a substantially constant flow rate. This flow rate (normal flow rate) can be greater than or equal to 100 Nm³/H, or even often greater than or equal to 1,000 Nm³/H.

In the case where the filtering system F1; F2 comprises a plurality of filtering cartridges, said pressure difference measured at measuring step S1 is representative of the pressure loss generated by all the filtering cartridges.

The invention stems from the present inventor's desire to control the integrity of the filtering system by precisely monitoring the pressure loss generated by the filtering system during the filtration performed for the needs of the industrial process, at the operational gas flow rate of the process.

The invention thus makes it possible to continuously monitor, throughout the fermentation, and guarantees the integrity and sterility of the system during its operation.

According to the invention, said method thus comprises a measuring step S1 during which a pressure difference $\Delta P$, representative of the pressure loss generated by the filtering system F1; F2, is measured.

In relation thereto, a pressure difference measuring device is preferably used, said device having a first pressure connection C1, downstream from the filtering system and a second pressure connection C2, upstream from the pressure system. The pressure difference measured $\Delta P$ is the pressure difference between the first connection C1 and the second connection C2. This measuring device is distinguished from gauges commonly used in such a process to indicate end of service life by the measurement sensitivity which can be less than or equal to 10 millibars (1,000 Pascals), preferably less than 7.5 millibars (750 Pascals).

Here, the sensitivity of the measurement is understood to mean the smallest quantity that the measuring device is able to discern. After several experiments, the inventors determined that a device for measuring sensitivity less than 750 Pascals, or even less than or equal to 300 Pascals, or a even sensitivity between 50 Pascals and 300 Pascals would represent a good compromise between the cost of the device and the control method to be implemented.

In practice, the inventors determined that this sensitivity was a percentage in the order of 5% (or less) of the value $\Delta P0$ representative of the pressure loss generated by the filtering system when said at least one filtering cartridge is new. Typically, and in a housing filtering system containing and receiving a plurality of filtering cartridges, it is customary to obtain $\Delta P0$ values near 100 millibars (10,000 Pascals), for example between 50 millibars (5,000 Pascals) and 150 millibars (15,000 Pascals).

The measurement scale of the device preferably extends over a range of between 75,000 Pascals and 450,000 Pascals, preferably between 75,000 Pascals and 300,000 Pascals, and more preferably between 100,000 Pascals and 200,000 Pascals. The range of the measurement scale was determined by the inventors in connection with the steam $\Delta P0$ representative of the pressure loss generated by the filtering system when said at least one filtering cartridge is new. The range of this scale is preferably determined so as to be able to monitor the variation of the $\Delta P$ measurement at least on a range between a zero lower limit ($0*\Delta P0$) and an upper limit between $1.5*\Delta P0$ and $3*\Delta P0$, and preferably between $1.5*\Delta P0$ and $2*\Delta P0$. For example, the scale ranges between 0 Pascal and 150,000 Pascals.

The method also comprises the definition of a predetermined upper threshold Sh, representative of a certain fouling and/or a lower threshold Sb, representative of a preferential passage (a leak).

The method further comprises a testing step during which said measurement S1 is compared to the predetermined upper threshold Sh, and to the predetermined lower threshold Sb, in such a way as to consider said at least one filtering cartridge to be non-compliant when the pressure difference measured at the measuring step S1 falls outside a range located between said upper threshold Sh and said lower threshold Sb.

In the case of a filtering system comprising several filtering cartridges, all of the cartridges are considered to be non-compliant.

Thus and when the pressure difference measurement reaches or exceeds the upper threshold Sh, said at least one filtering cartridge is considered to be non-compliant. It is thus recommended that it be replaced with a new cartridge. It is important to note that this upper threshold is nonetheless determined at a value $\Delta P$ representative of an integral filtering cartridge, particularly an integral sterilizing cartridge (representative of a set of integral filtering cartridges in the case of a filtering system with several cartridges). According to an advantageous embodiment, which is developed hereinafter, this upper threshold Sh is determined, moreover, to be sufficiently low in order to avoid additional electricity consumption of the compressors generating the flow of gas to be filtered.

When the pressure difference measurement reaches or drops below the lower threshold Sb, said at least one filtering cartridge presents a risk of preferential passage (a leak). Said cartridge is considered as non-integral and thus non-compliant. In the case of a filtering system comprising several filtering cartridges, all of the filtering cartridges are considered to be non-integral. In this set, all or part of the filtering cartridges can be non-integral. The method can thus be followed by a step to identify the non-integral filtering cartridge(s) in this set, once they have been removed from the filtering system.

According to an embodiment, the method can comprise a preliminary step for measuring the pressure difference $\Delta P0$ representative of the pressure loss generated by the filtering system when said at least one filtering cartridge is new. Advantageously, the method includes a calibration step during which a calculation is notably used to determine said upper threshold Sh and/or the lower threshold Sb depending on said pressure difference $\Delta P0$ measured.

Thus, the upper threshold Sh and the lower threshold can be defined by the following formulas:

$$Sh=f(\Delta P0) \text{ and } Sb=g(\Delta P0) \text{ with}$$

f and g of the functions.

For example and, according to an embodiment, the upper threshold Sh and the lower threshold Sb can be easily determined by the following relations:

$$Sh=Kh*\Delta P0 \text{ with } Kh \text{ being a constant.}$$

Similarly, the lower threshold is defined by the following formula:

$$Sb=Kb*\Delta P0 \text{ with } Kb \text{ being a constant.}$$

According to yet another embodiment, charts (or correspondence tables) may be used to determine the values of the upper and lower thresholds according to the measured value of $\Delta P0$.

Thus, and according to this advantageous feature of the invention, the definition of the upper threshold Sh and the lower threshold Sb does not need to know the specific features of the filtering cartridge to be tested. Also, the control method and the definition of the upper and lower thresholds can be implemented without knowing the specific technical features of the filtering cartridge.

The process, and notably the decision regarding the compliance of said at least one filtering cartridge, can be implemented without the use of computer means.

Alternatively, and according to an embodiment, the method may comprise the following steps, implemented by computer means:

a step of emitting a signal comprising a measurement relative to the pressure difference $\Delta P$ measured during the measuring step S1, a step of recording said measured pressure difference value, in a computer file, at a time interval or in a continuous manner.

As the measurements are performed at time t, said method can include a step for generating a computer file comprising, for each measured pressure difference value, a time parameter t that is representative of the measurements. It is thus possible to monitor the change in the pressure difference ΔP, as a function of the time. The method can thus provide for the generation of a representative curve of the change in the pressure difference ΔP in relation to the time t and its display on a control screen. Typically at t=0, the measured pressure difference corresponds to the pressure difference ΔP0 when the cartridge(s) of the filtering system are new.

The implementation of computer means further enables a step of generating a warning signal Ae; Af when said measured pressure difference falls outside said range between said upper threshold Sh and said lower threshold Sb.

Specifically according to the diagram in FIG. 5, the method, when implemented by computer means, can comprise the following steps after recording of said upper threshold Sh and/or said lower threshold Sb:

the test step that comprises the comparison of the pressure difference measured during the measuring step S1 with said lower threshold (step S2 of the diagram) and the upper threshold (step S3 of the diagram), the generation of a warning signal Ae; Af when said measured pressure difference reaches the upper threshold Sh or the lower threshold Sb.

Computer means can further be implemented to perform the calibration step SOL automatically, and thus automatically generate the upper threshold Sh and/or the lower threshold Sb, after each filtering cartridge replacement.

Thus, the computer means can be used to perform the following steps:

measure MES_1 and record the pressure difference ΔP0 (step S00 of the diagram), define the upper threshold Sh and/or the lower threshold Sb in relation with the measured pressure difference ΔP0 (step S01 of the diagram).

For the step to determine the upper threshold and the lower threshold depending on ΔP0, the previously mentioned relations can be used.

Thus, the complete method could be that which is illustrated in the diagram of FIG. 5, and which corresponds to the following steps:

the measuring step S01 (MES_1) for which the pressure difference ΔP0 is measured when the cartridge(s) of the filtering system are new, the calibration step S02 (CALC_ET) for which the upper threshold Sh and the lower threshold Sb are defined, notably by calculation, in relation with the pressure difference ΔP0, the measuring step S1 (MES-2) during which a pressure difference ΔP, representative of the pressure loss generated by the filtering system F1; F2, is measured, the test step S2 during which said pressure difference, measured during the step S1, is compared to the lower threshold Sb determined during the step S02, the test step S3 during which said pressure difference, measured during the step S1, is compared to the upper threshold Sh determined during the step S02.

According to this diagram, and in general:

in the case where the pressure difference, measured during the step S1, is equal to or less than the lower threshold Sb, a "leak" warning signal is issued, in the case where the pressure difference, measured during the step S1, is equal to or greater than the upper threshold Sh, a "fouling" warning signal is issued.

The steps S1, S2 and S3 are periodically repeated at regular intervals to ensure that the filtering system is monitored over time.

According to an embodiment, the value of the upper threshold Sh can be between 1.3*ΔP0 and 3*ΔP0, preferably between 1.4*ΔP0 and 2*ΔP0, and more preferably between 1.4*ΔP0 and 1.6*ΔP0. In this case, the constant Kh can thus be between 1.3 and 3, preferably between 1.4 and 2 and more preferably between 1.4 and 1.6. According to the findings of the inventors, in the majority of cases, at a pressure difference measured to 3*ΔP0, said at least one filtering cartridge, particularly a sterilizing cartridge, can always be considered as integral in the sense that the filtered gas can be considered sterile.

However, and although the integrity of said at least one cartridge is not called into question, the pressure loss generated results in significant additional consumption of the compressors required to perform the filtration. This is the reason why an upper threshold of lower value is preferable, notably between 1.4*ΔP0 and 2*ΔP0, preferably between 1.4*ΔP0 and 1.6*ΔP0. The definition of such an upper threshold makes it possible to avoid these additional electricity consumption of the compressors.

As far as the lower threshold value Sb is concerned, the latter can be between 0.7*ΔP0 and 0.95*ΔP0, preferably between 0.88*ΔP0 and 0.92*ΔP0. The constant Kb can thus be between 0.7 and 0.95, preferably between 0.88 and 0.92.

Figure 2:
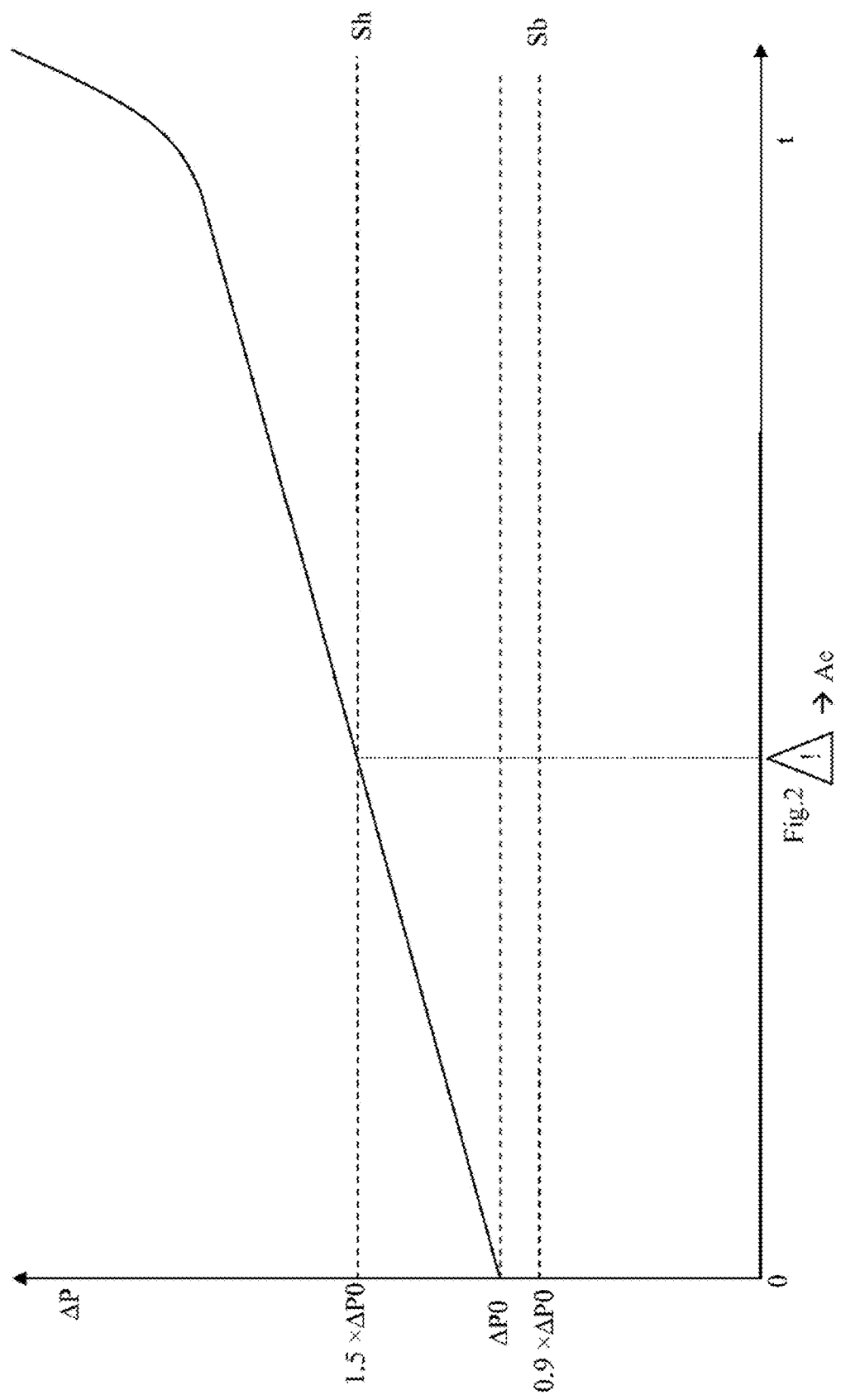
FIG. 2 is a graph showing the measured pressure difference ΔP on the Y-axis, and the time on the X-axis, with triggering of a fouling warning signal.
Figure 3:
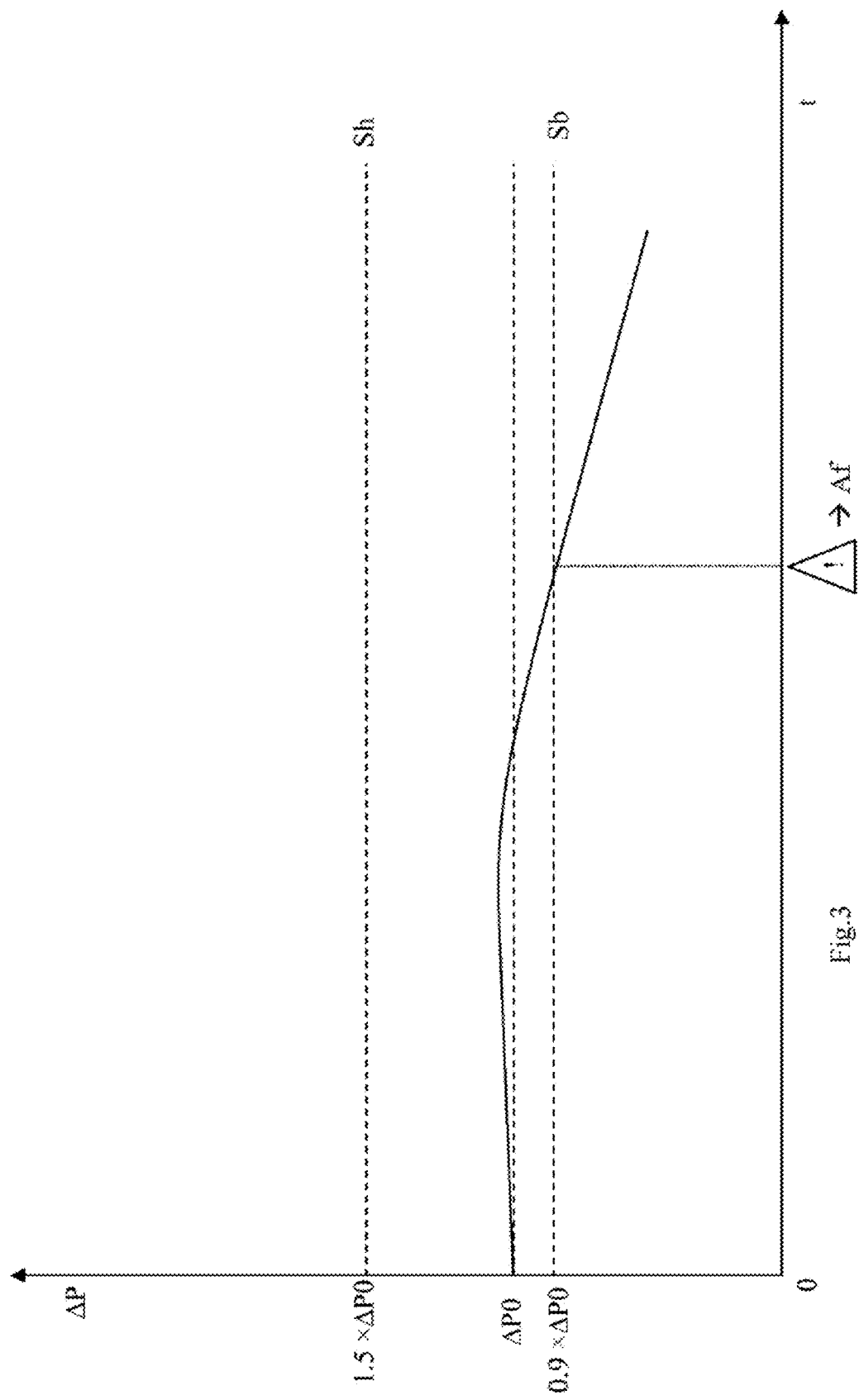
FIG. 3 is a graph showing the measured pressure difference ΔP on the Y-axis, and the time on the X-axis, with triggering of a leak warning signal.

FIGS. 2 to 3 illustrate examples, without limitation, of different representative curves of various scenarios for the filtering cartridges controlled in-line.

The example in FIG. 2 illustrates a first scenario of the change in the measured pressure difference ΔP, from t=0 corresponding to the renewal of the filtering cartridges of the filtering system. According to this example, due to the fouling of the filtering cartridges, the pressure difference ΔP, measured at step S1, increases progressively until it reaches, and then exceeds the upper threshold Sh defined as 1.5*ΔP0. When this upper threshold Sh is reached, a warning signal Ae is issued. This signal is interpreted as excessive fouling. It is recommended that said at least one filtering cartridge be replaced.

The example in FIG. 3 illustrates a second scenario of the change in the measured pressure difference ΔP, from t=0 corresponding to the renewal of the filtering cartridges of the filtering system. According to this example, due to the fouling of the filtering cartridges, the pressure difference ΔP, measured at step S1, increases progressively then begins to drop until it reaches, and then falls below a lower threshold defined as 0.9*ΔP0. When this lower threshold Sb is reached, a warning signal Af is issued. This warning signal is interpreted as a preferential passage in the filtering system (a leak), namely an integrity fault.

Figure 4:
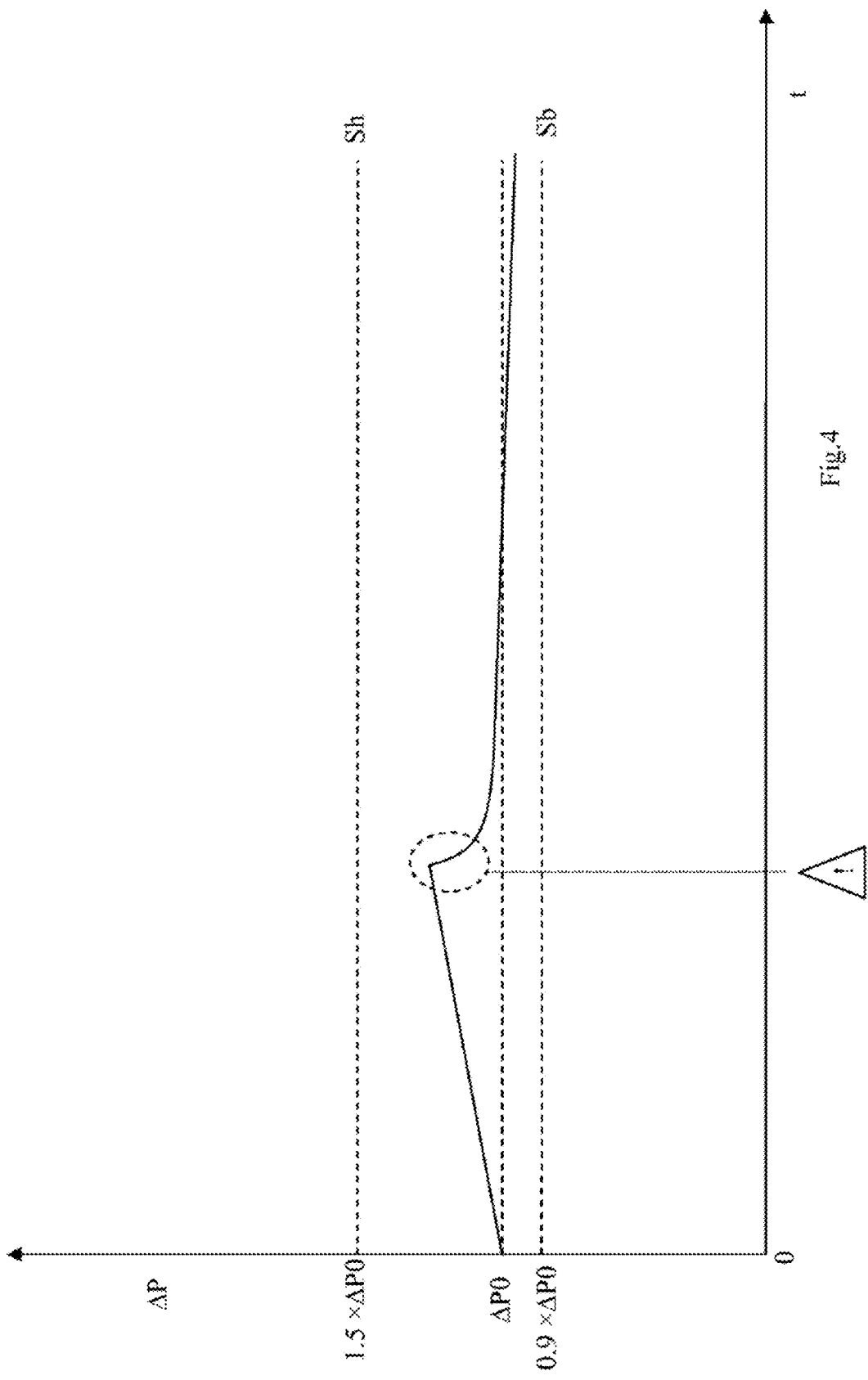
FIG. 4 is a graph showing the measured pressure difference ΔP on the Y-axis, and the time on the X-axis, the curve of which presents a sudden variation interpreted as an anomaly (e.g. de-clogging or leak).

The example in FIG. 4 illustrates a third scenario of the change in the measured pressure difference ΔP, from t=0 corresponding to the renewal of the filtering cartridges of the filtering system. According to this example, due to the fouling of the filtering cartridges, the pressure difference ΔP, measured at step S1, increases progressively then suddenly drops while remaining between the upper and lower limits defined by the upper threshold and the lower threshold. The analysis of the curve, visually or by computer calculating means, can be used to detect an anomaly. Thus, the observation of hammering and/or sudden variations may be interpreted as an anomaly on the gas system, notably on the filtering system.

Figure 6:
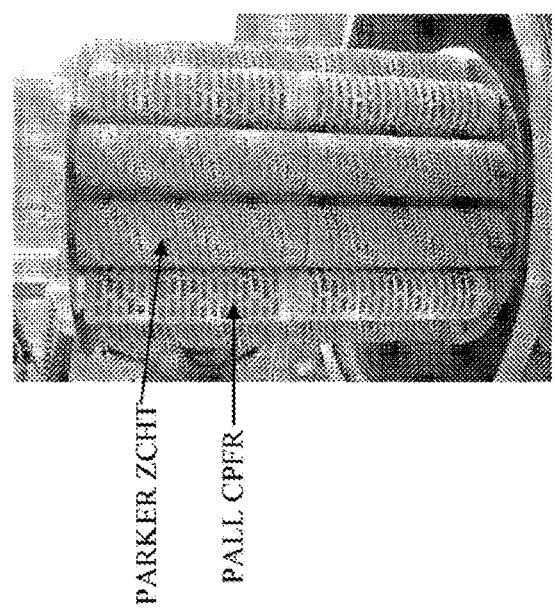
FIG. 6 is a photo of a filtering system whose housing receives twenty sterilizing type filtering cartridges.

Tests:

The present applicant performed preliminary tests to check the pertinence of the integrity control on the sterilizing filtering cartridge, by monitoring the ΔP measurement, representative of the pressure loss of the filtering system. These tests were conducted on filtering cartridges measuring 6 cm in diameter. These are 0.01 micron rated sterilizing cartridges. These filtering cartridges are used in a filtering system illustrated in the photo provided in FIG. 6 and whose housing receives 20 filtering cartridges.

This filtering system is designed to sterilize the air which is then used in the batch fermentation processes, in the type of installation illustrated in FIG. 1. These cartridges comprise PALL CPFR brand cartridges and PARKER ZCHT brand cartridges.

Figure 7:
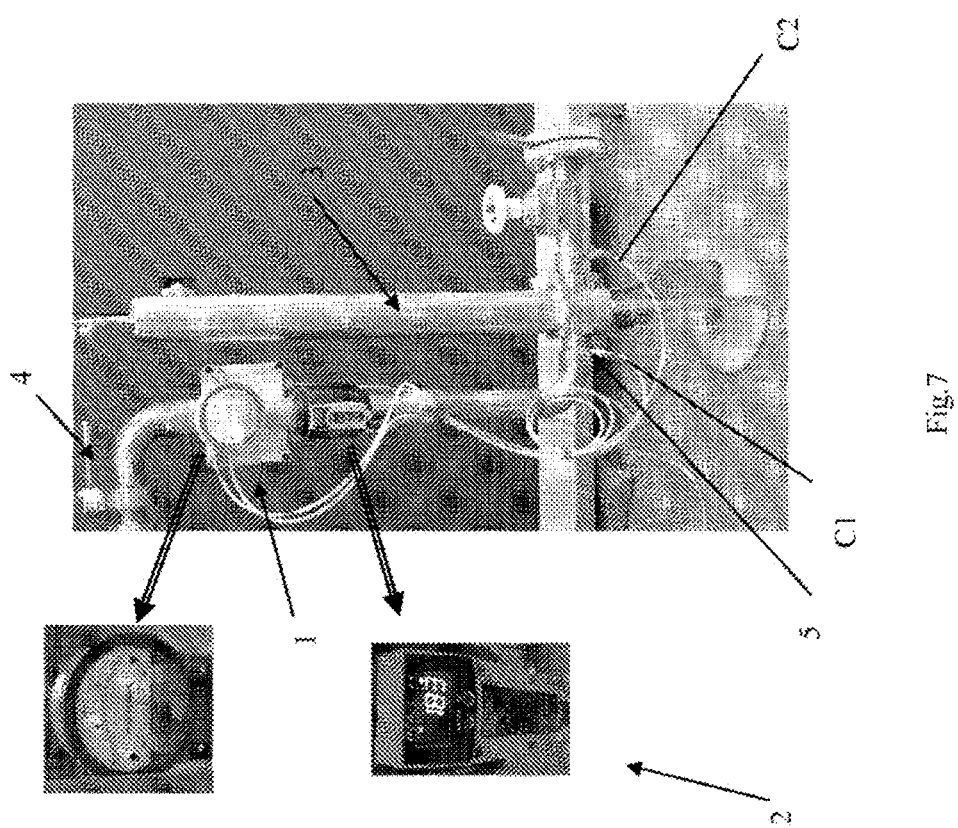
FIG. 7 is a photo of a test bench built by the present applicant to confirm the suitability of the control method according to the invention.

A test bench, illustrated in the photo in FIG. 7, was furthermore designed. This test bench is connected to the facility's compressed air source.

This test bench comprises:
a flowmeter 2,
a housing 3 designed to receive a filtering cartridge to be tested,
a pressure difference measurement device 1, in this case a MAGNEHELIC differential pressure gauge, whose measurement scale on the dial extends from 0 to 15 kilo Pascals,
a flow control valve 4,
a shut-off valve 5.

This test bench allows implementation of the test protocol which comprises the following steps:
1) Ensure that the zero point of the differential pressure gauge is correctly adjusted,
2) Place a new cartridge in the housing 3,
3) Close the valves 4 and 5,
4) Open the air supply valve of the facility's network,
5) Open the shut-off valve 5,
6) Open and adjust the flow control valve 4 until the determined test flow rate can be read on the flowmeter,
7) Check that the device correctly indicates the reference value (ΔP0) determined for this cartridge,
8) Close the shut-off valve 5,
9) Replace the new cartridge with a cartridge to be controlled (of the same type),
10) Open the shut-off valve 5,
11) Read the differential pressure (ΔP).

This test bench was notably used to control the PALL CPFR filtering cartridges mentioned above, after one and a half years (1.5 years) of use to filter the air used in the industrial fermentation processes.

To implement this test, the flow rate, pressure difference ΔP0, upper threshold Sh and lower threshold Sb values are as follows:

| Cartridge | | Test flow rate at +/− 5 Nm³/h | Pressure (1 KPa = 10 mb) | | |
|---|---|---|---|---|---|
| Type | Length | | ΔP0 (reference value) | Lower threshold | Upper threshold |
| CPFR | 20 P | 180 Nm³/h | 95 mb | 70 mb | 150 mb |

The following is considered according to this test and in a manner similar to the invention:

a) If ΔP, measured at step 11 of the protocol, is less than or equal to the lower threshold Sb, the filtering cartridge is non-integral, b) If ΔP, measured at step 11 of the protocol, is strictly above the lower threshold and strictly below the upper threshold, the cartridge is considered to be integral and in compliance, c) If measured ΔP is greater than or equal to the upper threshold, the cartridge is fouled and its replacement is recommended; such a cartridge is not necessarily to be considered as non-integral.

The used filtering cartridges mentioned above were tested according to this protocol. The cartridges whose ΔP is between the lower threshold and the upper threshold, considered as compliant, were retained.

Five cartridges considered as compliant were returned to the manufacturer for conventional integrity testing, namely an aerosol test recognized by the manufacturer, conducted using a "Valairdata II type WVA203FFV" device by the PARKER HANNIFIN Company, and by the PALL Company, on a "Flowstar IV" integrity test instrument.

All the cartridges considered compliant according to the test protocol were considered integral by the manufacturer.

PARTS LIST

1. Pressure difference measuring device,
2. Flowmeter (test bench),
3. Housing (test bench),
4. Flow control valve (test bench),
5. Shut-off valve (test bench),
Ae. Fouling signal,
Af. Leak signal,
C1. First pressure connection,
C2. Second pressure connection,
F1; F2. Filtering system,
R. Fermentation reactor,
Sh. Upper threshold,
Sb. Lower threshold,
ΔP. Pressure difference (Step S1),
ΔP0. Pressure difference (for a filtering system with new cartridge(s)),

The invention claimed is:

1. A method for in-line control of the integrity of a filtering system implemented in an industrial process involving the filtration of a gas through said filtering system, wherein the industrial process is an industrial process for which said filtration is a sterilizing filtration, said filtering system (F1; F2) comprising at least one filtering cartridge, the method comprising at least the following steps:
a measuring step (S1) during which a pressure difference ΔP, representative of the pressure loss generated by the filtering system (F1; F2), is measured,
a testing step (S2, S3) during which said measurement (S1) is compared to a predetermined upper threshold (Sh) and a predetermined lower threshold (Sb), in such a way as to consider said at least one filtering cartridge to be non-compliant when the pressure difference measured in the measuring step (S1) falls outside a range located between said upper threshold (Sh) and said lower threshold (Sb)
said method comprising a preliminary step (S01) for measuring the pressure difference ΔP0 representative of the pressure loss generated by the filtering system when said at least one filtering cartridge is new, and a calibration step during which a calculation is notably used to determine said upper threshold (Sh) and the lower threshold (Sb) depending on said pressure difference $\Delta P0$ measured, wherein the measurement of the pressure difference made during the measuring step (S1) is performed by means of a pressure difference measuring device having sensitivity of 5% or less of the value $\Delta P0$ representative of the pressure loss generated by the filtering system when said at least one filtering cartridge is new, Wherein $\Delta P0$ being the pressure loss generated by the filtering system when said at least one cartridge is new, and wherein the value of the lower threshold (Sb) is between $0.7*\Delta P0$ and $0.95*\Delta P0$ and wherein the value of the upper threshold (Sh) is between $1.3*\Delta P0$ and $3*\Delta P0$, and wherein the state of integrity of said at least cartridge in the sense that the filtered gas are considered sterile is implemented by monitoring only pressure difference $\Delta P$, representative of the pressure loss generated by the filtering system (F1; F2).

2. The method as claimed in claim 1, wherein the value of the upper threshold (Sh) is between $1.4*\Delta P0$ and $2*\Delta P0$.

3. The method as claimed in claim 1, wherein the value of the upper threshold (Sh) is between $1.4*\Delta P0$ and $2*\Delta P0$.

4. The method as claimed in claim 1, wherein the value of the upper threshold (Sh) is between $1.4*\Delta P0$ and $1.6\Delta P0$.

5. The method as claimed in claim 1, $\Delta P0$ being the pressure loss generated by the filtering system when said at least one cartridge is new, and wherein the value of the lower threshold (Sb) is between $0.88*\Delta P0$ and $0.92*\Delta P0$.

6. The method as claimed in claim 1, wherein the measurement of the pressure difference made during the measuring step (S1) is performed by means of a pressure difference measuring device having sensitivity less or equal to 300 Pascals said device having a first pressure connection (C1) downstream from the filtering system and a second pressure connection (C2) upstream from the filtering system.

7. The method as claimed in claim 1, comprising the following steps, implemented by computer means:
a step of emitting a signal comprising a measurement relative to the pressure difference $\Delta P$ measured during the measuring step (S1),
a step of recording said measured pressure difference value, in a computer file, at a time interval or in a continuous manner.

8. The method as claimed in claim 7, comprising a step of generating a warning signal (Ae; Af) when said measured pressure difference falls outside said range between said upper threshold (Sh) and said lower threshold (Sb).

9. The method as claimed in claim 1, wherein the filtering system (F1; F2) comprises a plurality of filtering cartridges, said pressure difference measured at measuring step (S1) being representative of the pressure loss generated by all the filtering cartridges.

10. The method as claimed in claim 7, wherein the measurement sensitivity between 50 Pascals and 200 Pascals.

11. The method as claimed in claim 1, wherein the measurement scale comprises a range between 75,000 Pascals and 200,000 Pascals.

12. The method as claimed in claim 1, wherein the industrial process is an industrial process providing normal gas flow rates to the filtering system greater than 100 $Nm^3/H$.

13. The method as claimed in claim 1, wherein the industrial process is an industrial fermentation process and wherein the filtering system (F1; F2) is used to treat the air supplying the fermentation reactor (R) or the tank of a material (G1) such as the glucose supplying the fermentation reactor (R).

* * * * *